United States Patent
Yamaue et al.

(10) Patent No.: US 8,049,127 B2
(45) Date of Patent: Nov. 1, 2011

(54) TOUCH PANEL

(75) Inventors: Nobuhiro Yamaue, Fukui (JP); Kenji Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 518 days.

(21) Appl. No.: 12/260,333

(22) Filed: Oct. 29, 2008

(65) Prior Publication Data

US 2009/0134001 A1    May 28, 2009

(30) Foreign Application Priority Data

Nov. 26, 2007 (JP) ................... 2007-304066

(51) Int. Cl.
*G06F 3/041* (2006.01)
(52) U.S. Cl. ........................ 200/512; 345/173
(58) Field of Classification Search .......... 200/512–517; 345/173, 176
See application file for complete search history.

(56) References Cited

U.S. PATENT DOCUMENTS

| | | | | |
|---|---|---|---|---|
| 7,439,466 B2* | 10/2008 | Yamaue et al. | ............... | 200/512 |
| 7,538,287 B2* | 5/2009 | Fujii et al. | ..................... | 200/512 |
| 7,804,491 B2* | 9/2010 | Inoue et al. | ................... | 345/173 |
| 2008/0170041 A1 | 7/2008 | Inoue et al. | | |

FOREIGN PATENT DOCUMENTS

| | | |
|---|---|---|
| CN | 101075170 A | 11/2007 |
| JP | 2003-58319 | 2/2003 |

* cited by examiner

*Primary Examiner* — Edwin A. Leon
*Assistant Examiner* — Marina Fishman
(74) *Attorney, Agent, or Firm* — Wenderoth, Lind & Ponack, L.L.P.

(57) ABSTRACT

A touch panel has an upper board having an upper conductive layer, a lower board having a lower conductive layer, a pair of upper electrodes along the periphery of the upper conductive layer and having an upper electrode lead, a pair of lower electrodes along the periphery of the lower conductive layer and having a lower electrode lead, and a slit formed at the upper and lower conductive layers. One of the upper electrodes is formed along a side of the upper conductive layer, and the other of the upper electrodes is formed in a substantially U shape surrounding a whole periphery excluding the upper electrode lead. One of the lower electrodes is formed in a direction orthogonal to the side of the upper conductive layer, and the other of the lower electrodes is formed in a substantially U shape surrounding a whole periphery excluding the lower electrode lead.

1 Claim, 3 Drawing Sheets

TOUCH PANEL

BACKGROUND OF THE INVENTION

1. Field of the Invention

The present invention relates to touch panels to be used primarily for operating various electronic equipment.

2. Background Art

In recent years, advance in multifunctionality and diversification of various electronic equipment such as mobile phones, car navigation systems or the like has been seen. Along with this trend, there has been an increase in electronic equipment in which various functions can be switched by pushing with a finger or a pen an optically transparent touch panel provided on the front surface of a display device such as a liquid crystal display while visually identifying through the touch panel what is displayed on the display behind the touch panel. Accordingly, touch panels are being sought that have good visibility and which assure precise operation.

Referring to FIGS. 4 through 6, description will now be given of a conventional touch panel. For easy understanding of the construction, the drawings are partially enlarged.

FIG. 4 is a sectional drawing of a conventional touch panel. FIG. 5 is a plan view of the upper board and the wiring board of FIG. 4. FIG. 6 is a plan view of the lower board and the wiring board of FIG. 4. In FIG. 4, upper board 1 and lower board 2 are films or thin sheets and are optically transparent. On the rear face of upper board 1 is formed optically transparent upper conductive layer 3 made of indium tin oxide. On the top face of lower board 2 is formed optically transparent lower conductive layer 4 made of indium tin oxide.

As shown in FIG. 5, a pair of upper electrodes 5, 6 made of silver and the like is formed on the top and bottom edges of upper conductive layer 3. Upper electrodes 5, 6 extend along the outer periphery of upper conductive layer 3, and plural leads 5A, 6A are provided on upper conductive layer 3. Also, as shown in FIG. 6, a pair of lower electrodes 7, 8 is provided at the left and right edges of lower conductive layer 4. Lower electrodes 7, 8 extend along the outer periphery of lower conductive layer 4, and plural leads 7A, 7B are provided at edges of lower conductive layer 4.

Also, as shown in FIG. 5, dummy pattern 9A and plural dummy patterns 9B are formed on the lower edge of upper board 1, and dummy pattern 9C is provided at the right edge in order to keep parallelism between upper board 1 and lower board 2. Slits 10A, 10B, 10C are formed at the inner right of upper electrode 5 of upper board 1, between upper electrodes 5, 6, between leads 5A, 5B, between leads 5A, 6A, at inner left of dummy pattern 9C, and between upper electrode 6 and dummy pattern 9A, by removing upper conductive layer 3 by means of laser processing and the like.

Also, as shown in FIG. 6, dummy pattern 9D is provided on the upper edge of lower board 2 and plural dummy patterns 9E are provided on the bottom edge in order to keep parallelism between upper board 1 and lower board 2. Slits 10D, 10E are formed at the inner top of lower electrodes 7, 8 of lower board 2, between leads 7A, 7B, and at the inner bottom of dummy pattern 9D, by removing lower conductive layer 4 by means of laser processing and the like. With these slits, short-circuiting between each electrode and the dummy patterns can be prevented thus maintaining insulation.

Also, plural dot spacers (not shown) are formed with an insulating resin at a predetermined interval on the top face of lower conductive layer 4. Nearly-frame-shaped spacer 11 is provided on the outer periphery on the top face of lower board 2, and outer peripheries of upper board 1 and lower board 2 are glued together with adhesive layer 12 coated on the top face of spacer 11. Upper conductive layer 3 and lower conductive layer 4 are oppositely disposed with a predetermined gap in between.

Furthermore, filmy wiring board 13 is sandwiched between upper board 1 and lower board 2. Upper edges of plural wiring patterns 14, 15 formed on the top and bottom faces of wiring board 13 are bonded and connected with leads 5A, 6A, leads 7A, 8A, respectively, with an anisotropic conductive adhesive (not shown) thereby completing a touch panel. Here, the anisotropic conductive adhesive is manufactured by dispersing conductive particles in a synthetic resin.

A touch panel constructed in this way is disposed on a front face of a display device such as a liquid crystal display and mounted on electronic equipment. And, plural wiring patterns 14, 15 of wiring board 13 are connected to electronic circuits (not shown) of the electronic equipment with a connector or by soldering.

In the above configuration, by pressing top face of upper board 1 with a finger or a pen in accordance with what is displayed on the display device behind the touch panel, upper board 1 is warped making upper conductive layer 3 of the pressed location come in contact with lower conductive layer 4. Subsequently, a voltage is sequentially applied from the electronic circuit through plural wiring patterns 14, 15 of wiring board 13 to both edges of upper electrodes 5, 6 and lower electrodes 7, 8 and to both edges of lower conductive layer 4 which is in an orthogonal direction. The electronic circuit detects the pressed location based on the ratio of these voltages, and switching of various functions of the electronic equipment is enabled.

That is, under a condition in which plural menus are displayed on the display device behind the touch panel, when the top face of upper board 1 on top of a desired menu is pressed, the electronic circuit detects the pressed location through plural wiring patterns 14, 15 of wiring board 13. In this way, selection of a desired menu from among plural menus can be made.

In such a touch panel, plural dummy patterns are formed in order to maintain parallelism between upper board 1 and lower board 2 in addition to upper electrodes 5, 6 and lower electrodes 7, 8. In addition, in order to prevent short-circuiting between electrodes and dummy patterns and maintain insulation, gap 17A is provided between upper right edge of upper electrode 5 of upper board 1 and upper edge of dummy pattern 9C, and gap 17B is provided between lower edge of dummy pattern 9C and right edge of dummy pattern 9A, for example.

Similarly, gap 17C is provided between upper edge of lower electrode 7 of lower board 2 and left edge of dummy pattern 9D, and gap 17D is provided between right edge of dummy pattern 9D and upper edge of lower electrode 8. Nearly-frame-shaped spacer 11 and adhesive layer 12 are formed by printing and the like method on the top face of lower board 2, and outer peripheries of upper board 1 and lower 2 are bonded together. During this process, at the edges of upper board 1 and lower board 2 where these gaps exist, plural openings are formed that communicate the gaps between upper conductive layer 3 and lower conductive layer 4 to the air.

As a result, when the top face of upper board 1 is pressed, air goes in and out through these gaps and openings. Sometimes, dusts or moisture attach to upper conductive layer 3 or to lower conductive layer 4 thus making electrical on-off action unstable. Furthermore, depending on the atmospheric pressure of the environment of the use of the touch panel, swelling or depression of upper board 1 may be caused, further causing interference fringes, the so-called Newton rings, due to reflection of external light and making displayed information on the display device behind the touch panel difficult to read.

Accordingly, in order to prevent these inconveniences and ensure reliable electrical on-off action and good visibility, the following is generally practiced at the expense of extra work. Namely, an adhesive is applied to these gaps and openings after bonding upper board 1 and lower board 2 together, and the air space between upper conductive layer 3 and lower conductive layer 4 is sealed.

As related art information of the invention of this application, Japanese Unexamined Patent Application Publication No. 2003-58319 is known.

As discussed above, conventional touch panels disadvantageously require sealing of plural gaps and openings with an adhesive in order to maintain insulation between electrodes and dummy patterns, costing time for fabrication and resulting in a higher cost.

SUMMARY OF THE INVENTION

The touch panel of the present invention includes an optically transparent upper board having an upper conductive layer formed on its lower face, an optically transparent lower board having a lower conductive layer, which is formed on its upper face and faces to the upper conductive layer with a predetermined gap in between, a pair of upper electrodes extending along an outer periphery of the upper conductive layer and having an upper electrode lead, a pair of lower electrodes extending along an outer periphery of the lower conductive layer and having a lower electrode lead, a slit in a predetermined shape formed on the upper conductive layer and the lower conductive layer. One of the pair of upper electrodes is formed along a side of the upper conductive layer, and the other of the pair of upper electrodes is formed in substantially U shape surrounding whole periphery excluding the upper electrode lead. One of the pair of lower electrodes is formed in a direction orthogonal to the side of the upper conductive layer, and the other of the pair of lower electrodes is formed in substantially U shape surrounding whole periphery excluding the lower electrode lead.

Because the upper electrodes and the lower electrodes extend in a manner enclosing the entire periphery along the outer periphery of the upper conductive layer and the lower conductive layer, gaps and openings are not formed except at the portions where upper electrode leads and the lower electrode leads exist, both of which are connected with a wiring board. As a result, there is no need to seal gaps or openings, so that fabrication becomes simple.

DETAILED DESCRIPTION OF PREFERRED EMBODIMENTS

Figure 1:
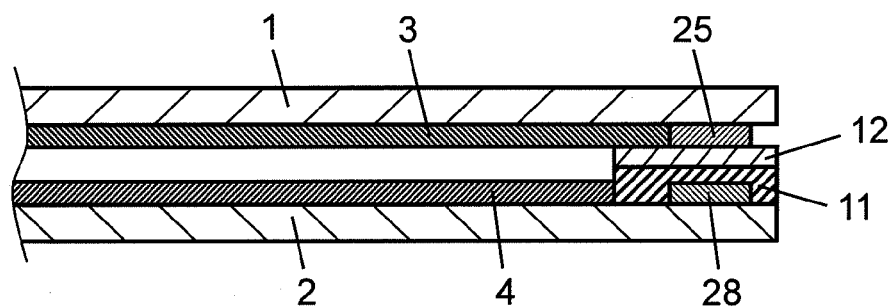
FIG. 1 is a sectional view of a touch panel in an embodiment of the present invention.

Referring to the drawings, description of an embodiment of the present invention will be given. This invention is not limited by the preferred embodiment.

In the following, description of the embodiment of the present invention will be given referring to FIG. 1 through FIG. 3.

For easy understanding of the structure, each drawing is rendered with some of the partial dimensions enlarged. Also, elements similar to those in the BACKGROUND ART have the same reference numbers, and the descriptions of those elements are omitted.

Preferred Embodiment

FIG. 1 is a sectional view of a touch panel in a preferred embodiment of the present invention. FIG. 2 is a plan view of the upper board and the wiring board in FIG. 1. FIG. 3 is a plan view of the lower board and the wiring board in FIG. 1.

In FIG. 1, optically transparent upper board 1 is made of a film of polyethylene terephthalate (PET) or polycarbonate (PC) or a thin sheet of glass. Optically transparent lower board 2 is also made of a film of PET or PC or a thin sheet of glass. Optically transparent upper conductive layer 3 made of indium tin oxide or tin oxide is formed on the lower face of upper board 1 while similarly made lower conductive layer 4 is formed on the top face of lower board 2 by sputtering and the like method.

Figure 2:
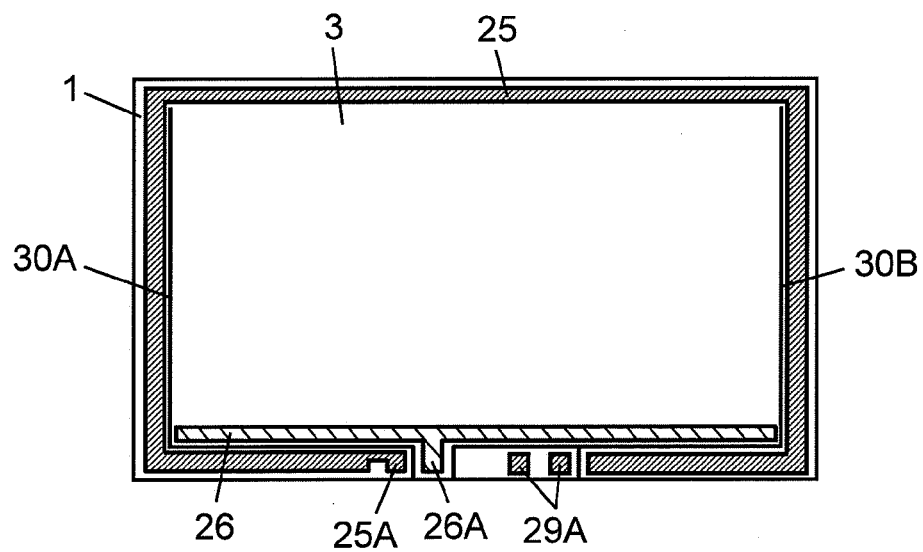
FIG. 2 is a plan view of an upper board and a wiring board in FIG. 1.
Figure 2:
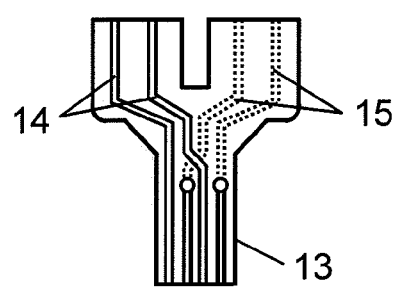

In FIG. 2, upper electrode 25 is formed with silver or carbon on the top edge of upper conductive layer 3. Upper electrode 26, which pairs with upper electrode 25, is formed along a side of the lower edge of upper conductive layer 3. Upper electrode leads 25A, 26A are provided on upper electrodes 25, 26, respectively. Upper electrode 25 extends along the outer periphery of upper conductive layer 3 and is formed nearly in the shape of letter U enclosing the entire periphery of upper conductive layer 3 except upper electrode leads 25A, 26A.

Figure 3:
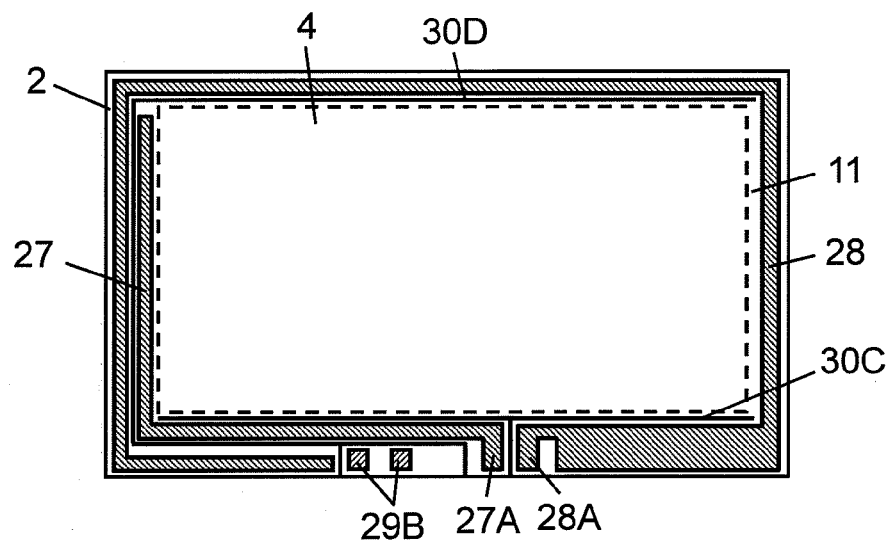
FIG. 3 is a plan view of a lower board and the wiring board in FIG. 1.
Figure 3:
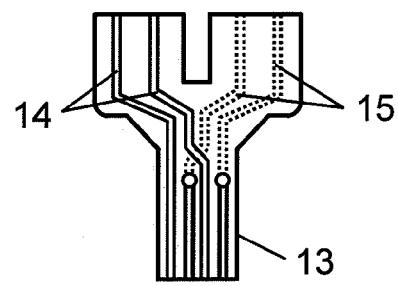
Figure 4:
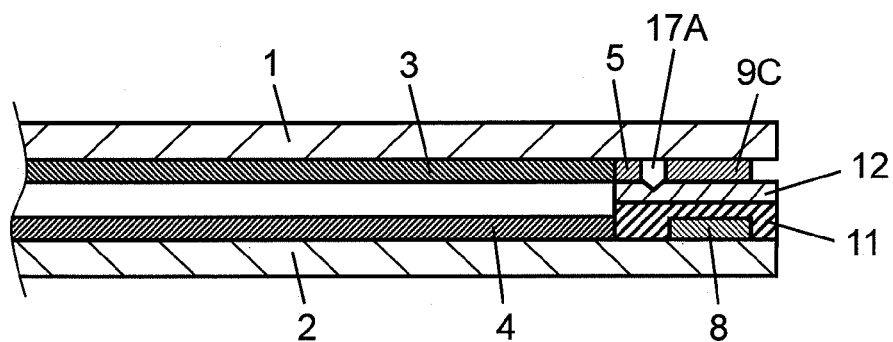
FIG. 4 is a sectional view of a conventional touch panel.
Figure 5:
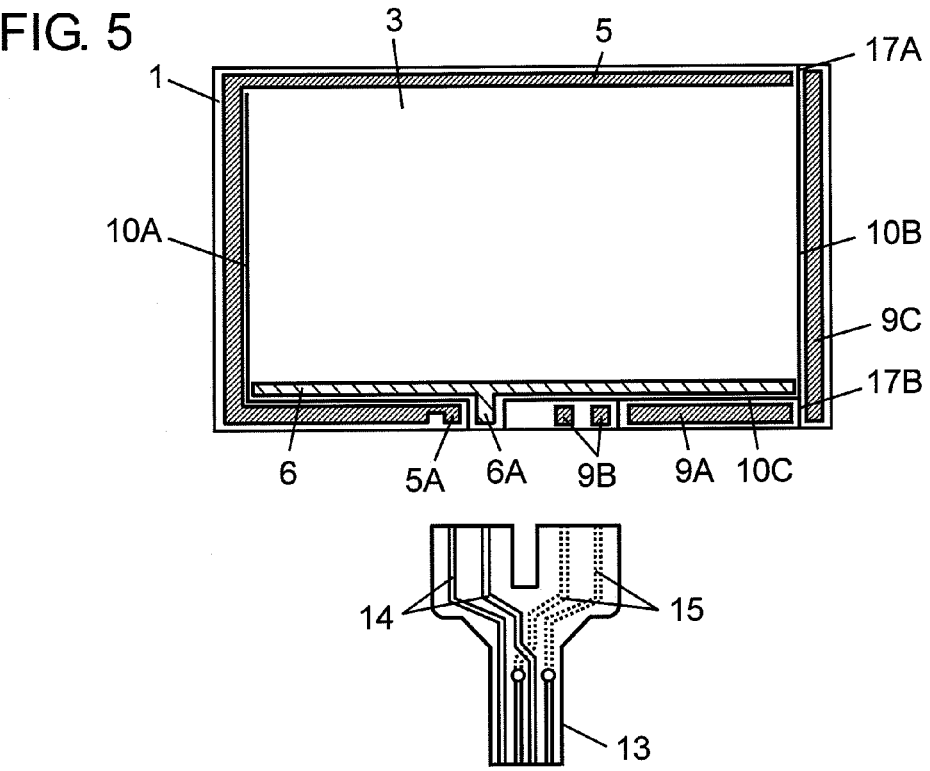
FIG. 5 is a plan view of the upper board and the wiring board in FIG. 4.
Figure 6:
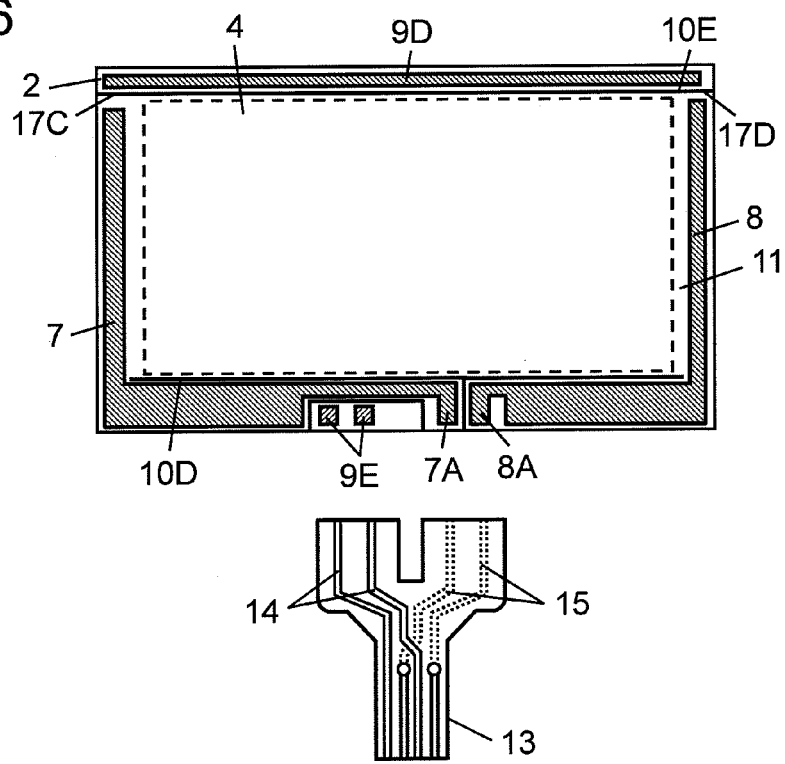
FIG. 6 is a plan view of the lower board and the wiring board in FIG. 4.

Also, as shown in FIG. 3, a pair of lower electrodes 27, 28 is formed on the outer periphery of lower conductive layer 4 in the direction orthogonal to upper electrodes 25, 26, respectively. At least lower electrode 27 is formed in a direction orthogonal to the side of upper conductive layer 3. Lower electrode leads 27A, 28A are provided at the edges of lower electrodes 27, 28, respectively. Lower electrode 27 is formed nearly in the shape of the letter L. Lower electrode 28 extends from the upper edge of lower conductive layer 4 to the left edge and further to the outer periphery at the left bottom edge thus enclosing the entire periphery of lower conductive layer 4_nearly in the shape of the letter U excluding lower electrode leads 27A, 28A.

Furthermore, plural dummy patterns 29A are provided at the lower edge of upper board 1 in FIG. 2 at locations corresponding to lower electrode leads 27A, 28A of lower board 2. Plural dummy patterns 29B are provided on lower board 2 at the locations corresponding to upper electrode leads 25A, 26A of upper board 1 in FIG. 3.

Slits 30A, 30B are formed by removing upper conductive layer 3 by laser cutting process and the like. As shown in FIG. 2, slit 30A is formed nearly in the shape of the letter L extending from inner left part of upper electrode 25, passing between upper electrode 25 on the left bottom edge and left edge of upper electrode 26, and between upper electrode leads 25A, 26A. Slit 30B is formed nearly in the shape of an inverted letter L by extending from inner right of upper electrode 25 to between upper electrode 25 on the lower right edge and right edge of upper electrode 26. Thus slits 30A, 30B are formed at upper conductive layer 3 in a predetermined shape.

Also, slits 30C, 30D are formed in the same manner by removing lower conductive layer 4. As shown in FIG. 3, slit 30C is formed nearly in the shape of the letter T by extending from inner lower edge of lower electrode 27 and lower electrode 28 to between lower electrode leads 27A, 28A. Slit 30D is formed nearly in the shape of the letter U by extending from inner upper right edge of lower electrode 28 passing along the left and bottom edges of lower electrode 27. With these slits 30A, 30B, 30C, 30D, short-circuiting between electrodes and dummy patterns can be prevented and insulation is maintained. Thus slits 30C, 30D are formed at lower conductive layer 4 in a predetermined shape.

Additionally, plural dot spacers (not shown) are formed with epoxy resin or silicone on the top face of lower conductive layer 4 at a predetermined spacing. Nearly-frame-shaped spacer 11 made of polyester resin or epoxy resin is provided on the outer periphery of the top face of lower board 2. Outer peripheries of upper board 1 and lower board 2 are bonded together with adhesive layer 12 of acrylic resin or rubber coated on the top face of spacer 11. Upper conductive layer 3 and lower conductive layer 4 face each other with a predetermined gap in between.

Also, filmy wiring board 13 is made of polyimide or PET. Wiring board 13 is sandwiched between upper board 1 and lower board 2. The upper edges of plural wiring patterns 14, 15 made of copper foil, silver, carbon, etc., formed on the top and bottom faces of wiring board 13 are connected by bonding with anisotropic conductive adhesive (not shown) to upper electrode leads 25A, 26A and lower electrode leads 27A, 28A, thus completing a touch panel. The anisotropic conductive adhesive is made by dispersing plural conductive particles prepared by gold-plating nickel or resin in a synthetic resin such as epoxy, acrylic, or polyester.

Put simply, nearly-U-shaped upper electrode 25 is formed on the bottom face of upper board 1 in a manner enclosing the entire periphery except upper electrode leads 25A, 26A. In addition, nearly-U-shaped lower electrode 28 is formed on the top face of lower board 2 in a manner enclosing the entire periphery except lower electrode leads 27A, 28A. In the state in which the outer peripheries of upper board 1 and lower board 2 are bonded together with adhesive layer 12, parallelism between upper board 1 and lower board 2 is maintained by upper electrode 25 and lower electrode 28 that extend over almost the entire circumference of the outer periphery. At the same time, no gaps or openings can be formed except at upper electrode leads 25A, 26A and lower electrode leads 27A, 28A.

Furthermore, at the locations on upper board 1 and lower board 2 where upper electrode leads 25A, 26A and lower electrode leads 27A, 28A are formed, wiring board 13 is sandwiched, bonded and connected with an anisotropic adhesive. As a result, in a completed touch panel, the entire outer peripheries of upper board 1 and lower board 2 are sealed, and the gap between upper conductive layer 3 and lower conductive layer 4 is sealed.

In the meantime, by coating an adhesive of acrylic resin or silicone resin to the location where upper board 1, lower board 2 and wiring board 13 are sandwiched, wiring board 13 can be more firmly secured. At the same time, the gap between upper conductive layer 3 and lower conductive layer 4 can be further securely sealed.

A touch panel constructed in this way is disposed on a front face of a display device such as a liquid crystal display and mounted on electronic equipment. Plural wiring patterns 14, 15 of wiring board 13 are electrically connected with electronic circuits (not shown) of the electronic equipment with a connector or by soldering.

In the above configuration, by pressing the top face of upper board 1 with a finger or a pen, upper board 1 is warped making upper conductive layer 3 of the pressed location come in contact with lower conductive layer 4.

A voltage is sequentially applied from the electronic circuit to upper electrodes 25, 26 and lower electrodes 27, 28 via plural wiring patterns 14, 15 of wiring board 13, and to both edges of upper conductive layer 3, and to both edges of lower conductive layer 4 which is orthogonal to upper conductive layer 3. Depending on the ratio of these voltages, the electronic circuit detects the pressed location and various functions of the equipment are switched.

That is, when the top face of upper board 1 on top of a desired menu is pressed under a state in which plural menus are displayed on the display device behind the touch panel, the electronic circuit detects the pressed location through plural wiring patterns 14, 15 of wiring board 13. In this way, a desired menu can be selected from among plural menus.

The touch panel configured as described above extends to the outer periphery on the lower face of upper board 1 and upper face of lower board 2, and is constructed in a manner such that the outer periphery is sealed leaving no gaps or openings by means of nearly-U-shaped upper electrodes 25 and lower electrodes 28 formed covering the entire periphery. As a result, no air enters the gap between upper conductive layer 3 and lower conductive layer 4 during pressing operation, and attachment of dust or moisture on upper conductive layer 3 or lower conductive layer 4 is prevented thus enabling stable electrical on-off action.

Also, as the gap between upper conductive layer 3 and lower conductive layer 4 is sealed, even when atmospheric pressure of the environment changes to some extent, there will be no swelling or denting of upper board 1 due to coming or going of air. Furthermore, the touch panel is configured in a manner such that an interference pattern, the so-called Newton's rings, due to reflection of external light can be prevented and good visibility of the display device behind the touch panel is obtained.

In addition, as the gap between upper conductive layer 3 and lower conductive layer 4 is sealed during fabrication of the touch panel, coating of an adhesive on gaps and openings is not required making fabrication easy. As a result, it becomes possible to manufacture touch panels at a low cost.

According to the preferred embodiment of the present invention as described above, upper electrode 25 extending from an edge of upper conductive layer 3 on the lower face of upper board 1, and lower electrode 28 extending from an edge in a direction orthogonal to upper conductive layer 3 of lower conductive layer 4 on the top face of lower board 2 are extended along the outer peripheries of upper conductive layer 3 and lower conductive layer 4, and are formed nearly in the shape of the letter U in a manner enclosing the entire periphery excluding upper electrode leads 25A, 26A, and lower electrode leads 27A, 28A. As a result, the parallelism between upper board 1 and lower board 2 can be maintained. As no gaps and openings are formed, the gap between upper conductive layer 3 and lower conductive layer 4 can be sealed by a simple structure. A touch panel is thus obtained which provides reliable electrical on-off action and good visibility.

In the above, description is made of a structure in which upper electrode 25 extending from the top edge of upper conductive layer 3 and lower electrode 28 extending from the right edge of lower conductive layer 4 are extended along the outer peripheries of upper conductive layer 3 and lower conductive layer 4 in a manner enclosing the entire periphery roughly in the shape of the letter U. In addition, in the case of lower board 2, for example, lower electrode 27 extending from the left edge of lower conductive layer 4 may be extended along the outer periphery of lower conductive layer 4 nearly in the shape of the letter U in a manner enclosing the entire periphery.

The touch panel in accordance with the present invention has the advantage of providing reliable electrical on-off action and good visibility with a simple structure, and is useful for operation of a variety of electronic equipment.

What is claimed is:

1. A touch panel comprising:

an optically transparent upper board;
an upper conductive layer formed on a lower face of said optically transparent upper board;
an optically transparent lower board;
a lower conductive layer formed on an upper face of said optically transparent lower board and which faces to the upper conductive layer with a predetermined gap in between;
a pair of upper electrodes extending along an outer periphery of the upper conductive layer and having an upper electrode lead;
a pair of lower electrodes extending along an outer periphery of the lower conductive layer and having a lower electrode lead; and
a slit in a predetermined shape formed at the upper conductive layer and the lower conductive layer; wherein
one of the upper electrodes is formed along a side of the upper conductive layer,
the other of the upper electrodes is formed in a substantially U shape surrounding a whole periphery of the upper conductive layer excluding the upper electrode lead,
one of the lower electrodes is formed in a direction orthogonal to the side of the upper conductive layer,
the other of the lower electrodes is formed in a substantially U shape surrounding a whole periphery of the lower conductive layer excluding the lower electrode lead.

* * * * *